United States Patent [19]

Winkler et al.

[11] Patent Number: 5,299,789
[45] Date of Patent: Apr. 5, 1994

[54] VARIABLE-RESILIENCE ENGINE MOUNT HAVING A RUBBER SPRING ELEMENT WITH A CAVITY FOR RECEIVING A CONTROL FLUID

[75] Inventors: Gerold Winkler, Birkenau; Gerd-Heinz Ticks, Waldmichelbach; Ludwig Schmitt, Birkenau, all of Fed. Rep. of Germany

[73] Assignee: Firma Carl Freudenberg, Weinheim, Fed. Rep. of Germany

[21] Appl. No.: 881,920

[22] Filed: May 12, 1992

[30] Foreign Application Priority Data

Jun. 25, 1991 [DE] Fed. Rep. of Germany ....... 4120840

[51] Int. Cl.$^5$ .............................................. F16F 9/08
[52] U.S. Cl. .......................... 267/140.14; 267/140.12
[58] Field of Search ..................... 267/140.11, 140.13, 267/146.14, 220, 35; 298/550, 562, 636

[56] References Cited

U.S. PATENT DOCUMENTS

| 4,352,487 | 10/1982 | Shtarkman | 267/140.13 |
| 4,392,634 | 7/1983 | Konishi | 267/140.13 |
| 4,650,169 | 3/1987 | Eberhard et al. | 267/140.13 |
| 4,867,263 | 9/1989 | Sugino et al. | 267/140.12 |
| 4,886,251 | 12/1989 | Haussermann | 267/140.12 |

FOREIGN PATENT DOCUMENTS 1-169140  7/1989  Japan .............................. 267/140.11

*Primary Examiner*—Matthew C. Graham
*Attorney, Agent, or Firm*—Sprung Horn Kramer & Woods

[57] ABSTRACT

In a variable-resilience engine mount a top member rests on two rubber spring elements which, in turn, rest on a parallel base. An ancillary component deactivates one of the spring elements when necessary. A first, outer spring element extends axially at least part-way up the second, inner spring element. The second spring element has a cavity at its center. A fluid can be injected into the cavity to inflate and expand the second spring element. The cavity will continue to inflate, making the mount less resilient as more fluid is injected, until it is stopped by a reinforcement surrounding it.

7 Claims, 2 Drawing Sheets

VARIABLE-RESILIENCE ENGINE MOUNT HAVING A RUBBER SPRING ELEMENT WITH A CAVITY FOR RECEIVING A CONTROL FLUID

BACKGROUND OF THE INVENTION

The invention concerns a variable-resilience engine mount. The mount comprises a top member which is supported in parallel relationship on a base member by a two rubber spring elements. An ancillary component deactivates one of the spring elements when necessary.

An engine mount of this type is known from German Patent No. 3,403,002. It depends upon the interaction between two spring elements of different resilience and on a coupling that can be engaged and disengaged between them. The electromagnetically engaged coupling is connected mechanically in series with the more rigid spring element and the resulting assembly is connected mechanically in parallel with the softer spring element. With the coupling disengaged, higher-frequency shorter-amplitude vibrations are isolated by the softer spring element. When the coupling is engaged, the sum of the two resiliences suppress lower-frequency, longer-amplitude vibrations.

This known type of engine mount is complicated, has many separate components that must be assembled and connected, and is accordingly uneconomical. Other drawbacks result from its design-dictated overall height and weight.

SUMMARY OF THE INVENTION

An object of the present invention is to provide an improved engine mount of the aforesaid type that will satisfactorily isolate shorter-amplitude vibrations, and will prevent the top member and base member from springing too close together and too far apart. A further object of the present invention is to provide an engine mount of the aforesaid type which is simpler in design, has fewer parts, is more economical to manufacture, and is also smaller and lighter in weight than the engine mounts of the type heretofore known.

These objects, as well as other objects which will become apparent from the discussion that follows, are achieved, according to the present invention, by providing a first, outer spring element that extends axially at least part-way up the second, inner spring element. The second spring element is formed with a cavity at its center in which a fluid can be injected to inflate and expand the second spring element. The fluid will continue to inflate the second spring element, making the mount less and less resilient, as more fluid is injected into the cavity, until inflation is stopped by a reinforcement surrounding the second spring element.

The essential concentricity of the two spring elements makes for a smaller engine mount both axially and radially. The mount has few parts. It isolates higher-frequency, shorter-amplitude vibrations as long as the second spring element does not rest tightly against the reinforcement and the engine mount remains resilient.

When a motor vehicle employing the engine mount drives over rough roads or curbs, the top member and base member of the mount would normally vibrate with great amplitude and would spring too close together and too far apart. In this case, the cavity is inflated to expand the second spring element against the reinforcement, decreasing the mount's resilience. The forces that act on the mount will then be accommodated primarily by the second spring element. Consequently, lower-frequency, longer-amplitude vibrations will be suppressed.

Precise levels of resilience can be obtained by using different materials for the spring elements. They can be made of the same material or of different materials. The cross-section of the cavity must be as large as possible to prevent the column of fluid in the incoming feed line from resonating. The fluid can be a compressible liquid or gas. The reinforcement referred to above can rest against the outer surface of the second spring element. For example, it can be a metal or plastic collar in a groove in the second spring element. If the first (outer) spring element is separated far enough from the second (inner) spring element, the collar can be flush with the surface of the second spring element, considerably decreasing the diameter of the engine mount. Such a mount is especially inexpensive to manufacture.

In another advantageous embodiment of the invention the reinforcement is embedded in the second spring element. This approach not only decreases the mount's diameter but renders it particularly efficient and prolongs its life. Such a reinforcement can also be metal or plastic, consist of one or more components, and fit into the second spring element in the form of an armature. The reinforcement must be designed and positioned to yield fairly extensively in the radially inward direction to allow the isolation of higher-frequency shorter-amplitude vibrations. As the cavity inflates, on the other hand, the reinforcement keeps the second spring element from expanding too far and, if the second spring element is substantially cylindrical, it generates enough pressure to effectively suppress the lower-frequency, longer-amplitude vibrations.

The reinforcement can, alternatively, be a woven collar. Such a woven collar can surround the second spring element to the top member of the cavity and support it like the aforesaid armature. The collar can be woven of rubber, for example, and be secured to the second spring element. This approach will prevent the reinforcement from moving in relation to the second spring element when the cavity is cinched in radially. It enables particularly simple adjustment of resilience to the particular application of the engine mount. One and the same engine mount can accordingly be adapted to just about any application merely by using a different type of reinforcement.

The fluid can be compressed above atmospheric pressure. The resulting tension of the cavity in the second spring element will be particularly easy to obtain when the fluid is a liquid. When the vehicle drives over a curb, for example, and the top and base members of the mount spring too close together and too far apart, the displacement can be controlled by injecting the compressed fluid into the cavity through a line. The fluid's resistance to compression will bring both spring elements into operation simultaneously, decreasing the resilience. If higher-frequency, shorter-amplitude vibrations have to be subsequently isolated, all that is necessary is to draw fluid out of the cavity, for example, through a hydraulic valve. The fluid can also be subjected to a vacuum to shrink the second spring element, especially in the region of the cavity, and retract it at least to some extent away from the reinforcement where it rests against the outer surface of the second spring element. This approach is of advantage when the fluid is a gas. The requisite gas valve is cost effective, contributing to the overall economy of the engine mount. When fluid is extracted from it, the second spring element surrounding the cavity will buckle inward and the engine mount will become even less rigid. Additionally, or alternatively, the space between the two spring elements can be evacuated. In this event the reinforcement that accommodates the second spring element can be provided with apertures, bores for example. A pressure in the space between the two spring elements that constitutes a vacuum relative to the pressure within the cavity will also expand the second spring element against the inner surface of the reinforcement to the top member of the cavity, enabling the engine mount to suppress lower-frequency, longer-amplitude vibrations. If the reinforcement is simultaneously an armature embedded in the second spring element for instance, the second spring element will bulge out and become essentially cylindrical. Care must be taken to ensure that the first spring element also deforms radially toward the second spring element.

The cavity in the second spring element must be designed and dimensioned to prevent the column of gas from resonating when the vacuum is generated. The cavity in the second spring element must be pressurized to suppress long-amplitude vibrations. The procedure will decrease the mount's resilience.

The first (outer) spring element is preferably of annular shape and arranged to surround the second spring element. Engine mounts with this feature are reliable, simple to manufacture, and short in diameter. An additional advantage is that the mount's total interior, comprising the reinforcement and the second spring element with its cavity, will be well protected from outside environment. Such an embodiment will retain its satisfactory properties over a long life.

The preferred embodiments of the present invention will now be described with reference to the accompanying drawings.

DESCRIPTION OF THE PREFERRED EMBODIMENTS

Figure 1:
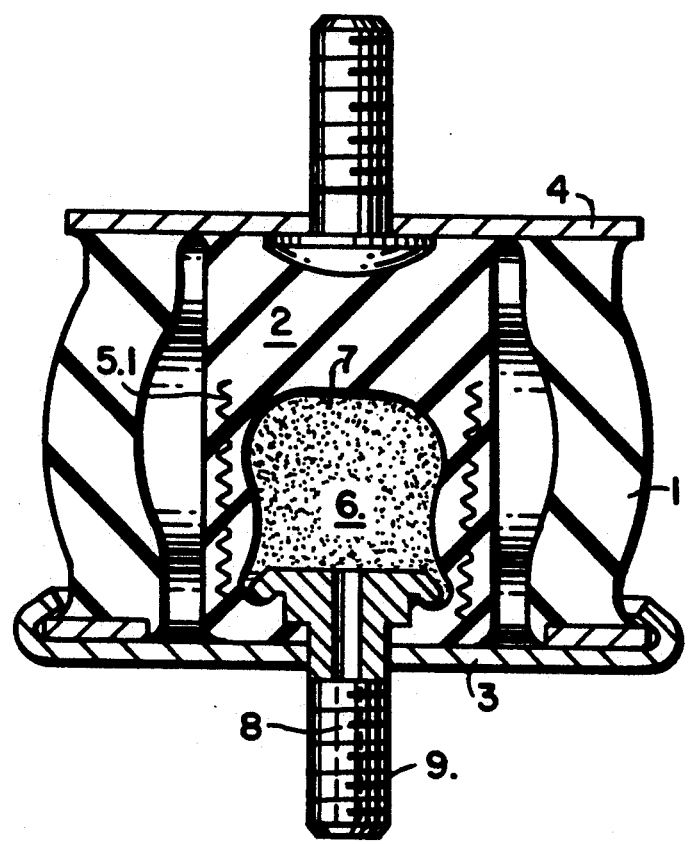
FIG. 1 is an axial cross-sectional view of an engine mount with a reinforcement embedded in the second spring element.

The engine mount illustrated in FIG. 1 consists essentially of a base member 3, a top member 4, and two spring elements 1 and 2. The first spring element 1, which is annular in shape, loosely surrounds the second spring element 2. The second spring element 2 accommodates a cavity 6. A fluid 7 can be injected into the cavity 6 through a line 8. The line in one advantageous embodiment of the invention is part of an attachment 9 to the base member 3. The fluid 7 can be either a liquid or a gas. The reinforcement 5 in one advantageous embodiment is an armature 5.1 embedded in second spring element 2 and extending up to approximately the top of the cavity 6. The armature readily yields radially inward for the purpose of effectively isolating higher frequency, shorter amplitude vibrations. However, the armature 5.1 yields radially outward very little, allowing enough pressure to build up in the cavity 6 in second spring element 2 to suppress lower frequency, longer amplitude vibrations.

Figure 2:
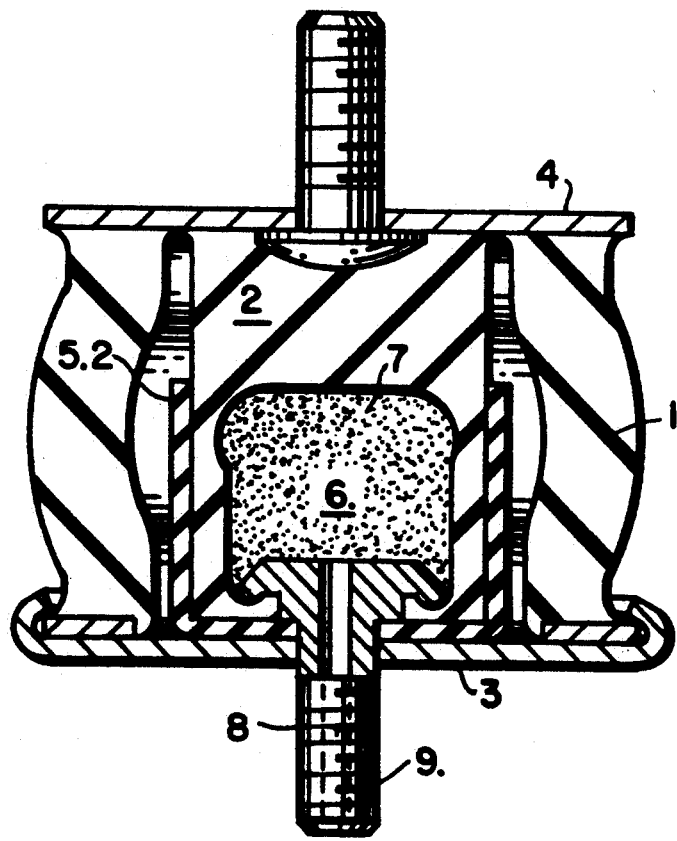
FIG. 2 is an axial cross-sectional view of an engine mount with a reinforcement in the form of a woven collar.
Figure 3:
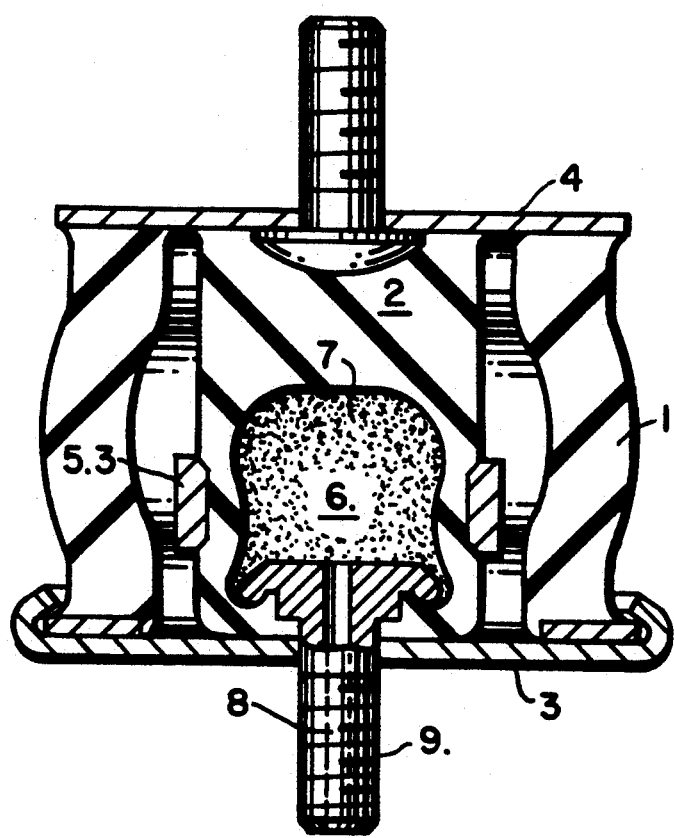
FIG. 3 is an axial cross-sectional view of an engine mount with a reinforcement attached to the outer surface of the second spring element.

The engine mounts illustrated in FIGS. 2 and 3 are essentially similar to those illustrated in FIG. 1 but have different types of reinforcements 5.

The reinforcement 5 illustrated in FIG. 2 is a woven collar 5.2 that extends essentially up to the top of the cavity 6. The reinforcement 5 illustrated in FIG. 3 is, a metal or plastic collar 5.3. The collar 5.3 is accommodated in a groove that extends around the second spring element 2 about half-way up the cavity 6. When the cavity 6 is unpressurized or subjected to a vacuum, the outer surface of the second spring element 2 retracts from the inner surface of the collar 5.3, causing the mount to yield axially comparatively easily. When the cavity 6 is pressurized, the outer surface of second spring element 2 expands against the inner surface of collar 5.3, which accordingly forms a stable retainer. The overall resilience of the engine mount is thus perceptibly decreased, and the mount therefore reliably prevents the base member 3 and top member 4 from springing too close together and too far apart. Depending upon the requirements for a specific engine mount, several rings can be stacked along the outer surface of the second spring element 2 to form the reinforcement.

There has thus been shown and described a novel variable-resilience engine mount that fulfills all the objects and advantages sought therefor. Many changes, modifications, variations, and other uses and applications of the subject invention will, however, become apparent to those skilled in the art after considering this specification and the accompanying drawings, which disclose the preferred embodiments thereof. All such changes, modifications, variations, and other uses and applications that do not depart from the spirit and scope of the invention are deemed to be covered by the invention, which is to be limited only by the claims that follow.

What is claimed is:

1. In a variable-resilience engine mount having atop member supported in substantially parallel relationship on a base member by first and second rubber spring elements, and an ancillary component for selectively changing the resilience of one of the spring elements, said first and second spring elements being connected mechanically in parallel and each of said first and second spring elements being connected between and to each of said top member and said base member, the improvement wherein the first spring element is annular shaped and disposed around the second spring element, wherein the first spring element extends axially at least part-way up the second spring element, wherein the second spring element has a cavity at its center, wherein an opening is provided for injecting a fluid into the cavity to inflate and expand the second spring element, and wherein a reinforcement is provided for limiting the expansion of the second spring element, whereby the resilience of the second spring element may be reduced by injecting fluid into the cavity.

2. The variable-resilience engine mount defined in claim 1, wherein the reinforcement rests against the outer surface of the second spring element.

3. The variable-resilience engine mount defined in claim 1, wherein the reinforcement is embedded in the second spring element.

4. The variable-resilience engine mount defined in claim 1, wherein the reinforcement is a woven collar.

5. The variable-resilience engine mount defined in claim 4, wherein the woven collar surrounds the second spring element to the top of the cavity.

6. The variable-resilience engine mount defined in claim 1, wherein the fluid is compressed above atmospheric pressure.

7. The variable-resilience engine mount defined in claim 1, wherein the fluid is subjected to a vacuum to deflate the second spring element and retract it at least to some extent away from the reinforcement which rests against the outer surface of the second spring element.

* * * * *